United States Patent Office 2,822,675
Patented Feb. 11, 1958

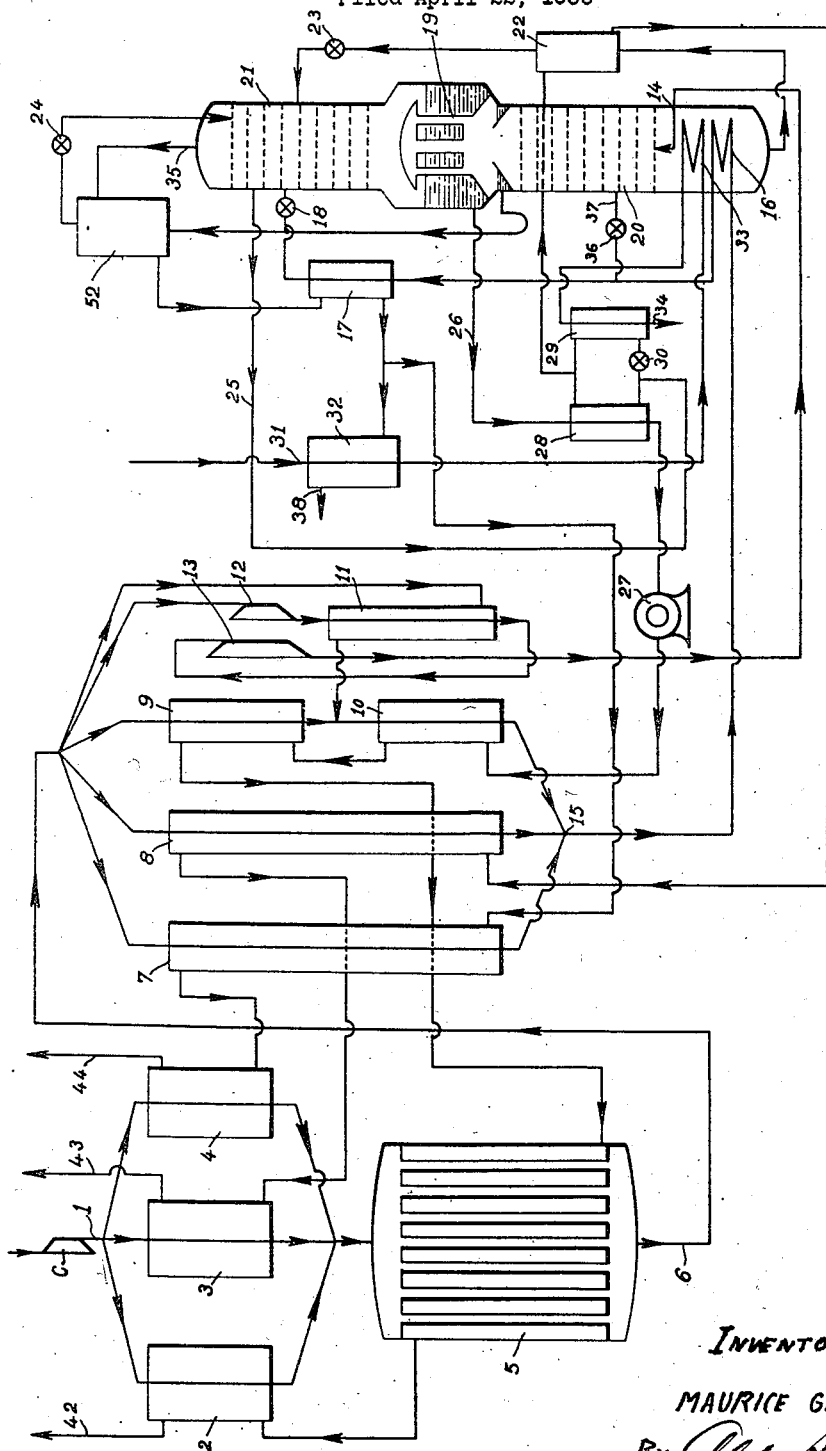

---

2,822,675

PRODUCTION OF GASEOUS OXYGEN UNDER PRESSURE

Maurice Grenier, Paris, France, assignor to L'Air Liquide, Societe Anonyme pour l'Etude et l'Exploitation des Procedes Georges Claude, Paris, France Application April 22, 1955, Serial No. 503,137

Claims priority, application France April 23, 1954

8 Claims. (Cl. 62—175.5)

The present invention concerns a process for the production from atmospheric air of gaseous oxygen under pressure.

The separation of air into oxygen and nitrogen (and eventually argon) by liquefaction and rectification is more easily effected the lower the rectification pressure. The separated gases generally leave the apparatus at close to atmospheric pressure. For numerous operations, particularly in metallurgy and in chemical manufacturing where a relatively high pressure is required, the oxygen must be compressed at the output end of the producing apparatus. The same applies when the oxygen is distributed by a pipeline system. The diameters of the pipes would be prohibitive if the gas were to circulate under low pressure. In either case, the oxygen must be compressed. This requires great expenditure of energy besides raising ticklish safety problems.

There have been proposals to produce the oxygen, put it under pressure to the liquid state, then vaporize it and distribute the compressed gas. The necessary energy to put a liquid under pressure is much less than for a gas. More specifically, there has been a proposal to vaporize the oxygen under pressure by exchange of the air to be rectified, compressed separately to a very high pressure, using a supplementary compressor. The present invention, as will be explained in detail, permits compression to a desired pressure of the total air to be separated.

The vaporization of oxygen under relatively high pressure presents special problems relating to the proper heat transfer between the incoming air and outgoing oxygen. The air in the course of being cooled must in effect absorb not only the sensible heat of the oxygen being heated to atmospheric temperature in the form of a liquid or gas but also the latent heat of vaporization of the liquid oxygen. This results in the necessity of increasing the heat capacity of the incoming air obtained by compressing this air to a sufficiently high pressure (the specific heat of gases rises with their pressure).

On the other hand, it is known that the most usual means of producing the necessary refrigeration for air separation apparatus is to take off a part of the air under operating pressure, in the course of its cooling, and to expand this part with external work so as to cool it to the neighbourhood of its dewpoint. The remainder, always under the initial pressure, is cooled again to the same dewpoint temperature and liquified, at least in part, by heat exchange with the products of separation (essentially nitrogen and oxygen).

To furnish the necessary amount of refrigeration, the expansion with external work should treat a sufficient mass of air, start with an initial minimum pressure, and be carried out on the air at a sufficiently high initial temperature that the expansion does not cause partial liquefaction of the air during expansion. But, on the other hand, it is necessary that, despite subtraction of the portion to be expanded from the total mass of the air, the rest of this mass possess a heating capacity sufficient to bring the products of separation back to normal temperature.

Increasing the initial pressure of the air favours this exchange by increasing the specific heat of the air at low temperatures at the same time as it increases the production of refrigeration. But, on the other hand, it has the disadvantage of increasing the consumption of energy.

*Applicant's development*

The present invention permits a marked economy of energy, for the type of plant, compared with known processes. It also provides great flexibility of operation, i. e., convenient adjustment of production rate according to needs. It permits, in addition, the production of at least a part, and sometimes all, the nitrogen in very pure condition (only several parts per million of argon and oxygen).

A first feature of the invention resides in the vaporization of the oxygen under pressure in countercurrent to the total amount of air to be separated.

In the course of cooling a gas by heat exchange with a vaporized liquid, the temperature of the gas decreases progressively up to a limit which cannot be lower than the temperature of vaporization of the liquid, a temperature which, on the contrary, remains fixed during the exchange. But, it is known that the thermodynamic efficiency of the heat exchange between two fluids is better the lower the temperature difference at both ends of the heat exchanger. At the cold end, this difference can be small, the minimum temperature obtained by the gas being, at the theoretical limit, the temperature of vaporization of the liquid. If this condition is substantially realized, the difference at the warm end will be smaller as the mass of gas to be cooled increases as compared with the mass of liquid to be vaporized. In the case where the gas and the liquid are respectively air to be separated into its components and the oxygen resulting from the separation, in accordance with the invention, the total air is exchanged against the available oxygen separated from the total air.

The vaporization of the liquid oxygen product under pressure can only be obtained by indirect heat exchange between the liquid oxygen product and the full amount of the air treated in the plant at the highest possible pressure. So, if the oxygen is produced, for example, under a pressure of 30 atmospheres, as the vaporization temperature of the oxygen is −132° C. under these conditions, the air will only be available for expansion in the expansion turbines at a temperature which is close to −132° C., if no heating step of the air is provided for.

But, under these conditions, for example, if the initial temperature of the expansion is in the neighbourhood of −132° C., straight expansion from full operating to rectification pressure in one stage would be impossible because the pressure of the rectification will liquefy a considerable proportion of the air. But, the liquefaction by expansion is to be avoided for two reasons. First, poor thermodynamic efficiency results and, second, there are serious mechanical problems resulting from the presence of liquid in an expansion machine. These reasons make it necessary then to expand the air from a temperature clearly greater than the vaporizing temperature of oxygen under pressure. This difficulty would render impossible the vaporization of the oxygen by the total mass of air.

Therefore, according to a second feature of the invention, expansion-producing cold is not effected in a single stage, from the initial pressure of the air to the rectification pressure. The air is subjected to a first expansion to an intermediate pressure, then is reheated by exchange with a portion of the air still under the initial pressure and it is submitted then to a second expansion to the pressure of rectification.

The invention is characterized principally by the combination of these first and second features, that is to say, the vaporization of the liquid oxygen under pressure in counter current with the total amount of air to be separated, associated with the two-step expansion of a part of this air.

It will be noted, on the other hand, that the relatively high specific heat of air under pressure at low temperature allows the use of only a relatively small amount of this air for heating in the low temperature range (below the temperature level of the temperature of vaporization of oxygen) all the gaseous nitrogen at low pressure and the liquid oxygen under pressure.

As a result, in an apparatus functioning in accordance with the invention, the air to be separated, initially compressed and freed by known means from humidity and carbon dioxide which it contains, is first partially cooled by heat exchange with the gaseous products of its separation, that is to say nitrogen at low pressure and oxygen at high pressure. It is thus, in its totality, cooled by heat exchange with the liquid oxygen in the course of vaporization under pressure. Thus partially cooled, it is divided into several portions. One portion is cooled by heat exchange with liquid oxygen which will be then vaporized. Another portion is cooled by the nitrogen leaving in gaseous condition from the rectification column. A third portion is subjected to a first partial expansion with external work, being thus heated in giving up its cold to a portion still under pressure, of the air to be cooled, then expanded again to the pressure of separation. The various portions of the air then enter a rectification column of a known type from which the oxygen is drawn in the liquid state at a relatively low pressure and pumped, always in the liquid state, to the desired pressure.

Following another feature of the invention, the oxygen leaving in liquid state and under a relatively low pressure from the rectification apparatus may be put under pressure by a pump of a known type of which the volumetric efficiency (in order to adapt the output of the pump to the effective production of the rectification apparatus) is regulated, at least partly, by causing the variable sub-cooling of the liquid oxygen before its admission into the pump. It is known in fact that in pumping a liquid at a boiling temperature, the filling of the pump is always incomplete.

Now that the invention has been generally explained, it will be described in further detail by reference to the attached drawing which is a schematic view of an apparatus according to the present invention.

The air to be separated is first compressed to a pressure in the neighbourhood of 40 atmospheres in compressor C and freed by known means from humidity and carbon dioxide which it contains. The air so treated enters the apparatus at 1 at about ambient temperature. It is divided among the three exchangers 2, 3 and 4, respectively cooled by the separated oxygen at a pressure in the neighbourhood of about 30 atmospheres, the impure nitrogen, and the separated high-purity nitrogen. These last two gases are at a pressure in the neighbourhood of atmospheric pressure. The three entering streams of air, thus cooled to the neighbourhood of —105° C., are recombined at the output end of the exchangers. The single stream resulting is further cooled in the exchanger 5 by the liquid oxygen product which is vaporized and heated under a pressure of about 30 atmospheres. The air, cooled to about —125° C. in this exchange, and always under its initial pressure (about 40 atmospheres) is again sub-divided into 5 streams which are cooled in the following manner:

A first stream is cooled in the exchanger 7 by the pure separated gaseous nitrogen; a second stream is cooled in the exchanger 8 by separated gaseous impure nitrogen; a third stream is cooled successively in the exchangers 9 and 10 by the liquid oxygen product under pressure of about 30 atmospheres. The high-pressure air stream leaving heat exchanger 9 joins with a fourth high-pressure air stream leaving the exchanger 11 where it has been cooled by a fifth stream of intermediate pressure air leaving the first stage of the expansion engine 12.

This fifth stream is sent into the expansion engine 12, in which its pressure is lowered to approximately 18 atmospheres. At the same time it is cooled to the neighbourhood of —155° C. It then enters into the exchanger 11, in which it is heated to about —140° C., cooling towards —152° C. the fourth stream. The fifth stream is then expanded again in the expansion turbine 13 to the pressure of the rectification column 20 (about 5 atmospheres). This expansion cools the fifth stream to about —172° C., i. e., in the neighbourhood of its dewpoint under the said pressure. It then enters at 14 into the column 20.

The streams leaving respectively the exchangers 7, 8 and 10 are combined at 15, the whole always under a pressure of about 40 atmospheres and at a temperature of around —170° C. is cooled in the exchanger 16 arranged at the base of the column 20. A part of this air, expanded through the valve 36, feeds the column 20 by the pipe 37. The remainder is further cooled to about —179° C. by the pure separated nitrogen in the exchanger 17, then expanded to about 1.2 absolute atmospheres through the valve 18 and it enters the low-pressure column 21, which is in heat-transfer relation with the column 20 through the reboiler 19.

From the base of the column 20, a liquid containing about 45% oxygen is drawn. It is cooled in the exchanger 22 by impure nitrogen then expanded by the valve 23 and it enters into the column 21. In the neighbourhood of the top of the column 20 there is drawn off in the liquid state substantially pure nitrogen. This is diverted to the top of column 21 after sub-cooling in the exchanger 52 and expansion by the valve 24.

A little below the top of the column 21, there is drawn off in gaseous state, by pipe 25, impure nitrogen, containing as a principal impurity argon from the treated air. This nitrogen is reheated in a series of exchangers as described below, and finally leaves the unit by the pipe 43.

From the bottom of the column 21, the liquid oxygen product is withdrawn through the pipe 26, subcooled in the heat exchanger 28 by indirect heat exchange with waste nitrogen and compressed to the desired pressure in the liquid pump 27. The impure nitrogen is not all sent into the exchanger 28. A part, regulable by the valve 30, is diverted to the exchanger 29 where it is used for liquefaction, by indirect contact, of a stream of nitrogen under pressure of about 20 atmospheres for instance, pure nitrogen produced by the described apparatus and recompressed to the said pressure in a suitable compressor (not shown). The stream of nitrogen arrives by the tube 31 which, after having been cooled from the ambient temperature to approximately —145° C. in the exchanger 32 by the pure nitrogen leaving from the column, is liquefied in the heating coil 33 arranged at the base of the column 20. Then it is sub-cooled in the exchanger 29 before leaving at 34 towards an utilization apparatus, for instance a liquid nitrogen washing column (not shown) of a coke oven gas separation apparatus. The impure nitrogen used in parallel for the cooling of the exchangers 28 and 29, then successively cools the exchangers 22, 8 and 3 already mentioned, and leaves the apparatus at 43.

The liquid oxygen, of which the pressure has been raised to about 30 atmospheres in the pump is first heated as a liquid in the heat exchangers 10 and 9, through which passes a part of the air to be separated, then the exchanger 5 where it is vaporized in cooling all the air feed, finally the exchanger 2, and leaves the plant at 42.

The pure nitrogen leaving at 35 from the top of the column 21 cools first, in the exchanger 52, the liquid nitrogen emanating from the top of the column 20, then in the exchanger 17 the fraction of air to be separated, feeding directly the column 21. The pure nitrogen stream is divided then into two parts. The first cools in the exchanger 32 the compressed nitrogen arriving by the pipe 31, then leaves by the tube 38. The second cools successively in the exchangers 7 and 4 the fractions of air to be separated, and leaves finally by the pipe 44.

By using the means described above, it is possible to obtain oxygen under a pressure of about 30 atmospheres, on the one hand, without any compression of the oxygen in the gaseous state. This presents important advantages not only of economy but also of safety. On the other hand, the initial air pressure necessary to attain the result is only 40 atmospheres instead of the higher pressures which would be necessary with other processes producing oxygen at the pressure indicated.

In other respects, the means indicated for the regulation of the coefficient of filling of the liquid oxygen pump permits the output of the pump to be adapted to variations in the demand for oxygen and, as a result, to maintain permanently, whatever be the production, a substantially constant level of liquid in the condenser-vaporizer joining the columns 20 and 21, which is necessary to the proper functioning of the apparatus.

I claim:

1. A process for the production by liquefaction and rectification of a gaseous oxygen under pressure from atmospheric air, in which the air to be rectified is cooled by vaporization under the relatively high pressure of liquid oxygen drawn under relatively low pressure from the rectification apparatus, comprising partially cooling the total amount of air to be treated compressed to a predetermined pressure, cooling the air by vaporization of the oxygen under pressure, dividing the air into four parts, subjecting the first part of the air to at least two successive expansions with external work while reheating the air between these expansions by heat exchange with the second part of the air, said second part being thus cooled, as an incident to said reheating, cooling the third part of the air by heat exchange with the liquid oxygen to be reheated before its vaporization, and cooling the fourth part of the air by heat exchange with at least part of the nitrogen derived from the separation.

2. A process according to claim 1 in which the cooling of the total air at the outset is accomplished by heat exchange with the gaseous products of separation.

3. A process according to claim 1 in which the oxygen drawn in the liquid state and under relatively low pressure from the rectification apparatus is put under the higher pressure by a piston pump, the output of the pump being regulated, at least in part, by variation in the volumetric efficiency of filling, this variation being obtained by variation of the sub-cooling of the liquid oxygen under low pressure.

4. A process for the production by liquefaction and rectification of a component gas under pressure from a compound gas, in which the compound gas to be rectified is cooled by vaporization under the relatively high pressure of the component gas drawn in a liquid state and under relatively low pressure from the rectification apparatus, comprising, partially cooling the total amount of compound gas to be treated, compressing this compound gas to a predetermined pressure, cooling the compound gas by vaporization of the component gas under pressure, dividing the compound gas into four parts, subjecting the first part of the compound gas to at least two successive expansions with external work while reheating the compound gas between these expansions by heat exchange with the second part of the compound gas, said second part being thus cooled, as an incident to said reheating, cooling the third part of the compound gas by heat exchange with the liquid component gas to be reheated before its vaporization, and cooling the fourth part of the compound gas by heat exchange with at least part of another component gas derived from the separation.

5. A process according to claim 4, in which the cooling of the total compound gas at the outset is accomplished by heat exchange with the gaseous products of separation.

6. A process according to claim 4, in which the component gas drawn in the liquid state and under relatively low pressure from the rectification apparatus is put under the higher pressure by a piston pump, the output of the pump being regulated, at least in part, by variation in the volumetric efficiency of filling, this variation being obtained by variation of the sub-cooling of the liquid component gas under low pressure.

7. A process for the production by liquefaction and rectification of a gaseous oxygen under pressure from atmospheric air, in which the air to be rectified is cooled by vaporization under the relatively high pressure of liquid oxygen drawn under relatively low pressure from the rectification apparatus, comprising partially cooling the total amount of air to be treated compressed to a predetermined pressure, cooling the air by vaporization of the oxygen under pressure and subjecting at least a part of the air to at least two successive expansions with external work from successively lower initial pressures while reheating the air between these expansions.

8. A process for the production by liquefaction and rectification of a gaseous oxygen under pressure from atmospheric air, in which the air to be rectified is cooled by vaporization under the relatively high pressure of liquid oxygen drawn under relatively low pressure from the rectification apparatus, comprising partially cooling the total amount of air to be treated compressed to a predetermined pressure, cooling the air by vaporization of the oxygen under pressure, dividing the air into at least three parts, subjecting the first part to at least two successive expansions with external work while reheating the air between these expansions by heat exchange with the second part of the air, said second part being thus cooled, and cooling the third part by heat exchange with the liquid oxygen to be reheated before its vaporization.

References Cited in the file of this patent

UNITED STATES PATENTS

| | | |
|---|---|---|
| 2,030,509 | Frankl | Feb. 11, 1936 |
| 2,504,051 | Scheibel | Apr. 11, 1950 |
| 2,667,043 | Collins | Jan. 26, 1954 |
| 2,708,831 | Wilkinson | May 24, 1955 |